(12) United States Patent
Rozman et al.

(10) Patent No.: US 10,110,000 B2
(45) Date of Patent: Oct. 23, 2018

(54) POWER MANAGEMENT AND DISTRIBUTION ARCHITECTURE FOR A SPACE VEHICLE

(71) Applicant: Hamilton Sundstrand Corporation, Charlotte, NC (US)

(72) Inventors: Gregory I Rozman, Rockford, IL (US); Michael Anthony Futrell, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 144 days.

(21) Appl. No.: 15/443,627

(22) Filed: Feb. 27, 2017

(65) Prior Publication Data

US 2018/0244407 A1 Aug. 30, 2018

(51) Int. Cl.
*H02J 1/10* (2006.01)
*H02J 3/46* (2006.01)
(Continued)

(52) U.S. Cl.
CPC ............... *H02J 1/10* (2013.01); *B64G 1/428* (2013.01); *H02J 1/00* (2013.01); *H02J 1/02* (2013.01);
(Continued)

(58) Field of Classification Search
CPC ..... B64G 1/428; H02J 1/00; H02J 1/08; H02J 1/02; H02J 1/10; H02J 3/36; H02J 3/385;
(Continued)

(56) References Cited

U.S. PATENT DOCUMENTS

| 4,649,287 A | 3/1987 | Nola |
| 5,228,644 A | 7/1993 | Garriott |

(Continued)

FOREIGN PATENT DOCUMENTS

| CN | 102324583 | 1/2012 |
| CN | 103414235 | 11/2013 |

(Continued)

OTHER PUBLICATIONS

Extended European Search Report dated Dec. 7, 2017 in European Application No. 17196176.6.

(Continued)

*Primary Examiner* — Carlos Amaya
(74) *Attorney, Agent, or Firm* — Snell & Wilmer L.L.P.

(57) ABSTRACT

A power management and distribution system may comprise a first plurality of power sources, a first collector bus configured to receive power from the first plurality of power sources, an unregulated DC bus configured to receive power from the first collector bus, a regulated high voltage direct current (HVDC) bus configured to receive a first power from the unregulated DC bus, a first primary load bidirectional DC/DC converter configured to receive a second power from the unregulated DC bus, a first primary PDU configured to receive at least one of the first power from the regulated HVDC bus and the second power from the first primary load bidirectional DC/DC converter. The first primary PDU may be configured to supply power to a primary load such as a motor or actuator.

20 Claims, 9 Drawing Sheets

(51) Int. Cl.
*B64G 1/42* (2006.01)
*H02J 7/00* (2006.01)
*H02J 1/08* (2006.01)
*H02J 1/02* (2006.01)
*H02J 3/38* (2006.01)
*H02J 3/36* (2006.01)
*H02J 7/34* (2006.01)
*H02J 9/00* (2006.01)
*H02J 1/00* (2006.01)
*H02J 7/35* (2006.01)

(52) U.S. Cl.
CPC .................. *H02J 1/08* (2013.01); *H02J 3/36* (2013.01); *H02J 3/385* (2013.01); *H02J 7/0068* (2013.01); *H02J 7/345* (2013.01); *H02J 7/35* (2013.01); *H02J 9/00* (2013.01); *H02J 2001/008* (2013.01)

(58) Field of Classification Search
CPC ...... H02J 7/0068; H02J 7/35; H02J 2001/008; H02J 9/00; H02J 9/06; H02J 2009/068
USPC .......................................................... 307/24
See application file for complete search history.

(56) References Cited

U.S. PATENT DOCUMENTS

| | | | |
|---|---|---|---|
| 5,311,419 | A | 5/1994 | Shires |
| 5,604,430 | A | 2/1997 | Decker |
| 5,892,299 | A | 4/1999 | Siewert |
| 6,049,190 | A | 4/2000 | Canter |
| 6,344,700 | B1 | 2/2002 | Eisenhauer |
| 7,150,938 | B2 | 12/2006 | Munshi |
| 7,492,057 | B2 * | 2/2009 | Baldwin .............. H02J 1/16 307/64 |
| 7,852,049 | B2 | 12/2010 | Maddali |
| 8,022,661 | B1 | 9/2011 | Bauer |
| 8,550,405 | B2 | 10/2013 | Hruby |
| 8,789,791 | B2 | 7/2014 | Matasso |
| 9,276,401 | B2 | 3/2016 | Rozman |
| 2009/0310391 | A1 | 12/2009 | Becker-Irvin |
| 2011/0073714 | A1 | 3/2011 | Hruby |
| 2011/0299303 | A1 | 12/2011 | Lee |
| 2012/0232728 | A1 | 9/2012 | Karimi |
| 2012/0326516 | A1 | 12/2012 | Gurunathan |

FOREIGN PATENT DOCUMENTS

| | | |
|---|---|---|
| CN | 103414236 | 11/2013 |
| CN | 104300663 | 1/2015 |
| CN | 105429182 | 3/2016 |
| JP | H0530656 | 2/1993 |
| RU | 2411618 | 2/2011 |
| RU | 2430860 | 10/2011 |
| RU | 2476972 | 2/2013 |
| WO | 2012010613 | 1/2012 |

OTHER PUBLICATIONS

European Patent Office, European Search Report dated Mar. 14, 2018 in Application No. 17196097.4-1202.
Macie, et al., "Power processing requirements for solar electric propulsion," Proceedings of the Annual Power Electronics Specialists Conference (PESC), Blackburg, Jun. 22-26, 1987; Proceedings of the Annual Power Electronics Specialists Conference, (PESC), New York, IEEE, US, Apr. 19, 1971.
Rozman, et al., U.S. Appl. No. 15/348,413, filed Nov. 10, 2016 and entitled Electric Power System for a Space Vehicle.
Rozman, et al., U.S. Appl. No. 15/348,379, filed Nov. 10, 2016 and entitled Solar Powered Spacecraft Power System.
English translation of Russian U.S. Pat. No. 2,574,911, dated Feb. 10, 2016 and owned by Information Satellite Systems (a copy of the patent cannot be located).
English translation of Russian U.S. Pat. No. 2,574,475, dated Feb. 10, 2016, assignee unknown (a copy of the patent cannot be located).
Gao, et al., "Parallehl-Connected Solar PV System to Address Partial and Rapidly Fluctuating Shadow Conditions," IEEE Trans. on Industrial Electronics, vol. 56, No. 5, pp. 1548-1556, May 2009.
Thomas, et al., "DroopControl Method for Parallel DC Converters Used in Standalone PV-Wind Power Generating System," International Journal of Research in Engineering and Technology, vol. 4, Issue 10, Oct. 2015.
European Patent Office, European Search Report dated Jul. 16, 2018 in Application No. 18158950.8-1202.
Soeder J F et al: Overview and Evolution of the LERC PMAD DC Test Bed11 , Aerospace Power. San Diego, Aug. 3-7, 1992; [Proceedings of the I Ntersoci Ety Energy Conversion Engineering Conference (IECEC)], New York, IEEE, US, vol. 6, Aug. 3, 1992 (Aug. 3, 1992), pp. 6.43-6.48.
Button RM et al: Stability Testing and Analysis of a PMAD DC Test Bed for the Space Station Freedom11 , Aerospace Power. San Diego, Aug. 3-7, 1992; [Proceedings of the I Ntersoci Ety Energy Conversion Engineering Conference (IECEC)], New York, IEEE, US, vol. 6, Aug. 3, 1992 (Aug. 3, 1992), pp. 6.93-6.98.
Brush A S et al: Development and Testing of a 180-Volt DC Electronic Circuit Breaker With A 335-Ampere Carry and 1200-Ampere Interrupt Rating11 , Aerospace Power Systems. Boston, Aug. 4-9, 1991; [Proceedings of the I Ntersoci Ety Energy Conversion Engineering Conference], New York, IEEE, US, vol. 2, Aug. 4, 1991 (Aug. 4, 1991), pp. 358-363.
USPTO, Notice of Allowance dated Jul. 26, 2018 in U.S. Appl. No. 15/348,413.

* cited by examiner

POWER MANAGEMENT AND DISTRIBUTION ARCHITECTURE FOR A SPACE VEHICLE

FIELD

The disclosure generally relates to electrical power systems, and more particularly to the design of an electrical power system for a space vehicle.

BACKGROUND

Space vehicles typically employ electrical power systems for powering various electronic and/or electro-mechanical devices onboard the space vehicle. Electrical storage capacity may be limited during space flight due to the remote nature of space travel. Solar arrays may be used to provide a renewable energy source for the electrical power system.

SUMMARY

A power management and distribution (PMAD) system is disclosed, in accordance with various embodiments. A PMAD system may comprise a first plurality of power sources comprising at least one of a first solar array, a first supercapacitor, and a first battery, a first collector bus configured to receive power from the first plurality of power sources, an unregulated DC bus configured to receive power from the first collector bus, a regulated high voltage direct current (HVDC) bus configured to receive a first power from the unregulated DC bus, a first primary load bidirectional DC/DC converter configured to receive a second power from the unregulated DC bus, a first secondary power distribution unit (PDU) configured to receive the first power from the regulated HVDC bus, and a first primary PDU configured to receive at least one of the first power from the regulated HVDC bus and the second power from the first primary load bidirectional DC/DC converter, wherein the first primary PDU is configured to supply power to a primary load.

In various embodiments, the PMAD system may further comprise a primary load HVDC bus configured to receive the first power from the regulated HVDC bus and supply the first power to the first primary PDU, and a supercapacitor electronically coupled to the primary load HVDC bus and configured to supply power to the primary load HVDC bus. The PMAD system may further comprise a second plurality of power sources comprising at least one of a second solar array, a second supercapacitor, and a second battery, a second collector bus configured to receive power from the second plurality of power sources, a regulated low voltage direct current (LVDC) bus configured to receive a third power from the unregulated DC bus, a second primary load bidirectional DC/DC converter configured to receive a fourth power from the unregulated DC bus, a second secondary power distribution unit (PDU) configured to receive the third power from the regulated LVDC bus, and a second primary PDU configured to receive at least one of the third power from the regulated LVDC bus and the fourth power from the second primary load bidirectional DC/DC converter, wherein the unregulated DC bus is configured to receive power from the second collector bus. The PMAD system may further comprise a main load sharing regulator configured to regulate the power received by the first collector bus from the first plurality of power sources and configured to regulate the power received by the second collector bus from the second plurality of power sources. The first collector bus and the second collector bus may be connected in parallel. The regulated HVDC bus may be configured to receive power from the unregulated DC bus via a first bidirectional DC/DC converter connected in series with a first intermediate regulated bus, and a second bidirectional DC/DC converter connected in series with a second intermediate regulated bus, wherein the first intermediate regulated bus and the second intermediate regulated bus are connected in parallel.

A PMAD system is disclosed, in accordance with various embodiments. A PMAD system may comprise a main load sharing regulator, a first collector bus in electronic communication with the main load sharing regulator, a first plurality of power sources configured to supply power to the first collector bus an unregulated DC bus in electronic communication with the first collector bus and configured to receive power from the first collector bus, a first bidirectional DC/DC converter in electronic communication with the unregulated DC bus, a second bidirectional DC/DC converter in electronic communication with the unregulated DC bus, a first intermediate load sharing regulator in electronic communication with the first bidirectional DC/DC converter and the second bidirectional DC/DC converter, the first intermediate load sharing regulator configured to regulate the first bidirectional DC/DC converter and the second bidirectional DC/DC converter, a first intermediate regulated bus in electronic communication with the first bidirectional DC/DC converter, a second intermediate regulated bus in electronic communication with the second bidirectional DC/DC converter, the first intermediate regulated bus and the second intermediate regulated bus connected in parallel, a regulated high voltage direct current (HVDC) bus configured to receive power from at least one of the first intermediate regulated bus and the second intermediate regulated bus, a primary load HVDC bus configured to receive power from the regulated HVDC bus, a first power source configured to supply power to the primary load HVDC bus, a primary power distribution unit (PDU), and a primary load bidirectional DC/DC converter configured to receive power from the unregulated DC bus and configured to supply power to the primary PDU, wherein the primary PDU is configured to supply power to a first load.

In various embodiments, the PMAD system may further comprise a second collector bus in electronic communication with the main load sharing regulator and in electronic communication with the unregulated DC bus, a second plurality of power sources configured to supply power to the second collector bus, a third bidirectional DC/DC converter in electronic communication with the unregulated DC bus, a fourth bidirectional DC/DC converter in electronic communication with the unregulated DC bus, a second intermediate load sharing regulator in electronic communication with the third bidirectional DC/DC converter and the fourth bidirectional DC/DC converter, the second intermediate load sharing regulator configured to regulate the third bidirectional DC/DC converter and the fourth bidirectional DC/DC converter, a third intermediate regulated bus in electronic communication with the third bidirectional DC/DC converter, a fourth intermediate regulated bus in electronic communication with the fourth bidirectional DC/DC converter, the third intermediate regulated bus and the fourth intermediate regulated bus connected in parallel, and a regulated low voltage direct current (LVDC) bus configured to receive power from at least one of the third intermediate regulated bus and the fourth intermediate regulated bus, a primary load LVDC bus configured to receive power from the regulated LVDC bus, a second power source configured to supply power to the primary load LVDC bus, a second primary power distribution unit (PDU), and a second primary load bidirectional DC/DC converter configured to receive power from the unregulated DC bus and configured to supply power to the second primary PDU, wherein the second primary PDU is configured to supply power to a second load. The first collector bus and the second collector bus may be connected in parallel. The unregulated DC bus may be connected in series with the first collector bus and connected in series with the second collector bus. The first collector bus, the unregulated DC bus, the first bidirectional DC/DC converter, the first intermediate regulated bus, and the regulated HVDC bus may be connected in series. The first bidirectional DC/DC converter and the second bidirectional DC/DC converter may be connected in parallel. The first load may comprise a high voltage load and the second load may comprise a low voltage load. The first plurality of power sources may comprise a first solar array configured to supply power to the first collector bus via a first maximum power point tracking (MPPT) converter, a first battery in electronic communication with the first collector bus via the first bidirectional DC/DC converter, and a first supercapacitor in electronic communication with the first collector bus configured to at least one of receive power from the first collector bus, via the third bidirectional DC/DC converter, and supply power to the first collector bus, via the third bidirectional DC/DC converter. The second plurality of power sources may comprise a second solar array configured to supply power to the second collector bus via a second maximum power point tracking (MPPT) converter, a second battery in electronic communication with the second collector bus via the second bidirectional DC/DC converter, and a second supercapacitor in electronic communication with the second collector bus configured to at least one of receive power from the second collector bus, via a fourth bidirectional DC/DC converter, and supply power to the second collector bus, via the fourth bidirectional DC/DC converter. The main load sharing regulator may control the first MPPT converter, the second MPPT converter, the first bidirectional DC/DC converter, and the second bidirectional DC/DC converter. The first battery may be configured to at least one of receive power from the first collector bus, via the first bidirectional DC/DC converter and supply power to the first collector bus, via the first bidirectional DC/DC converter. The first power source may comprise a first supercapacitor and the second power source may comprise a second supercapacitor.

A method for supplying electric power to a load is disclosed, in accordance with various embodiments. A method for supplying electric power to a load may comprise receiving, by a first collector bus, electric power from a first plurality of electric power sources, receiving, by a second collector bus, electric power from a second plurality of electric power sources, regulating, by a main load sharing regulator, the electric power received by the first collector bus and the electric power received by the second collector bus, receiving, by an unregulated DC bus, electric power from at least one of the first collector bus and the second collector bus, the first collector bus and the second collector bus connected in parallel, receiving, by a regulated high voltage direct current (HVDC) bus, electric power from the unregulated DC bus, receiving, by a primary load HVDC bus, electric power from the regulated HVDC bus, receiving, by a primary load bidirectional DC/DC converter, electric power from the unregulated DC bus, and receiving, by a primary power distribution unit (PDU), electric power from at least one of the primary load HVDC bus and the primary load bidirectional DC/DC converter.

In various embodiments, the method may further comprise receiving, by the primary load HVDC bus, electric power from a capacitor via a bidirectional DC/DC converter. The method may further comprise receiving, by the primary load HVDC bus, electric power from the load.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
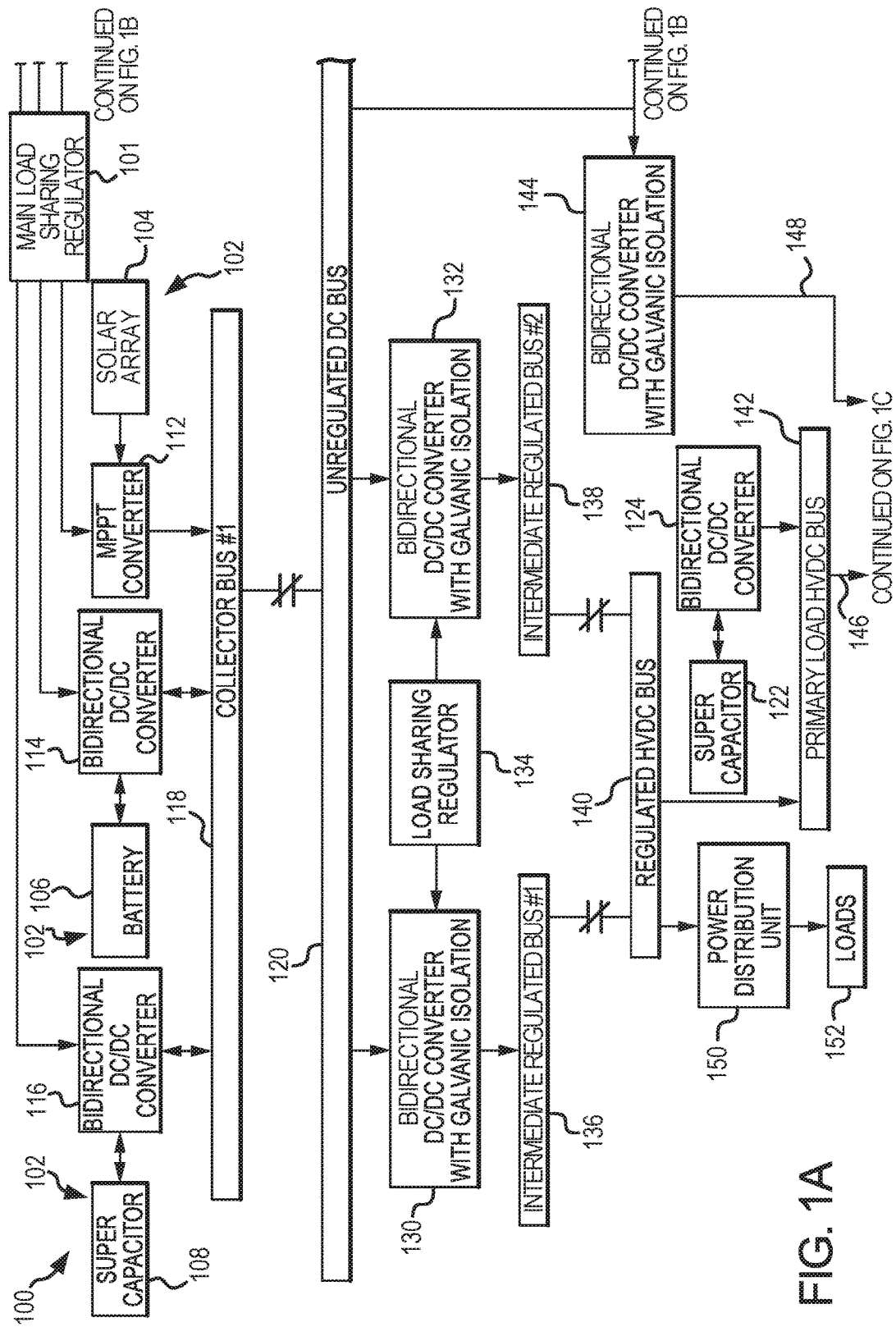
FIGS. 1A, 1B, 1C, and 1D illustrate a schematic view of a power management and distribution (PMAD) system with primary load support, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

As used herein, "connected" or "coupled" means "in electronic communication." As used herein, "direct electronic communication" means communication of electronic signals with no intermediary devices in the "electronic communication" other than a conduit for power, such as a wire.

Electrical power systems, as described herein, may provide redundancy in delivering electrical power to loads to maintain safe take-off, flight, and landing of a space vehicle. Electrical power systems, as described herein, may reduce electrical and thermal stresses on power electronics components during normal operation. Electrical power systems, as described herein, may support dynamic peak power typically associated with operation of actuators, such as rapid acceleration or regeneration, without oversizing the electrical power system. Electrical power systems, as described herein, may minimize voltage ripple effect on primary loads connected to the power bus during one of the primary loads short circuit or overload conditions. Electrical power systems, as described herein, may meet high overload capability to meet current to time trip curve characteristics. Electrical power systems, as described herein, may allow the sizing of solid state power controllers (SSPCs) to be reduced.

Figure 1B:
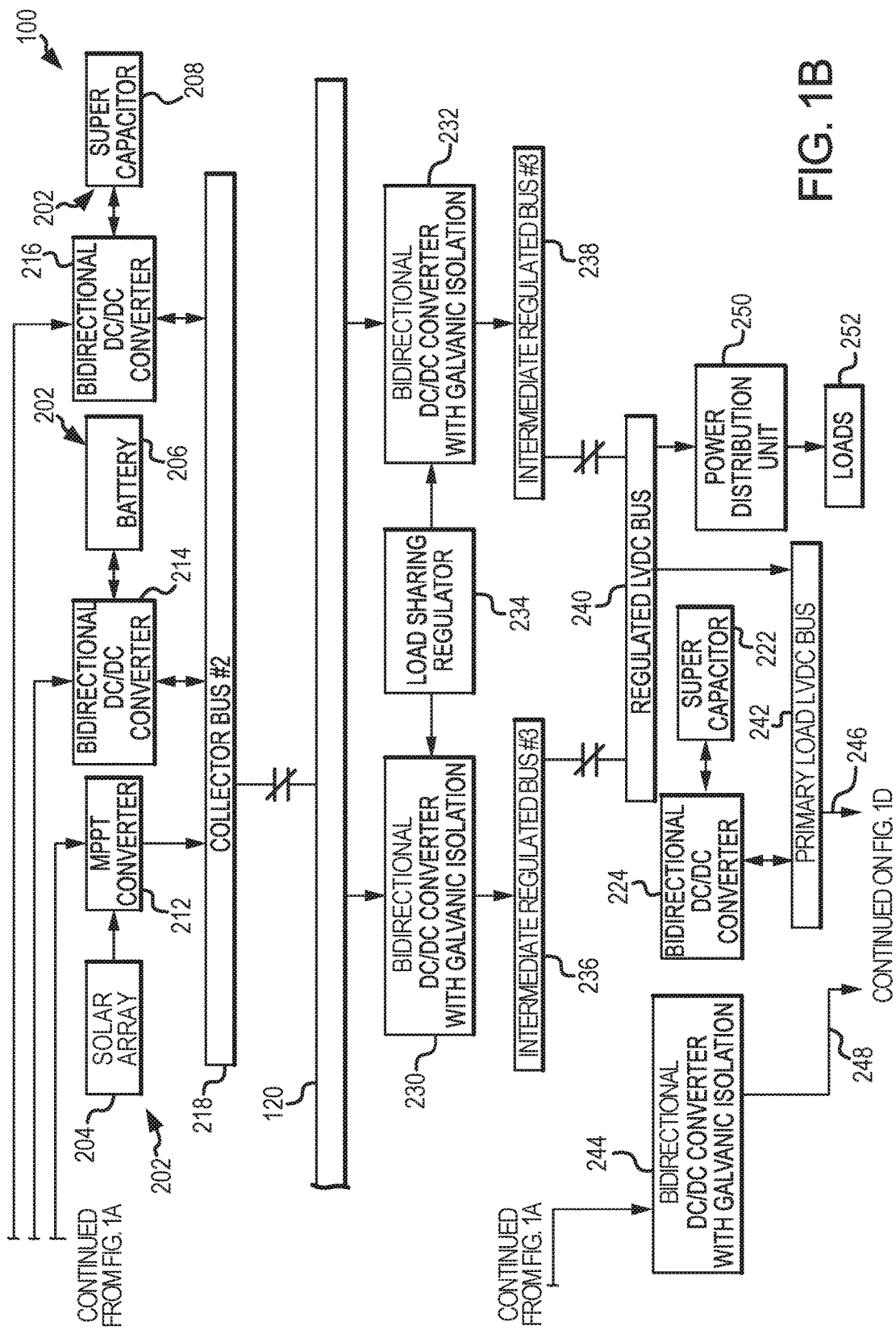
Figure 1D:
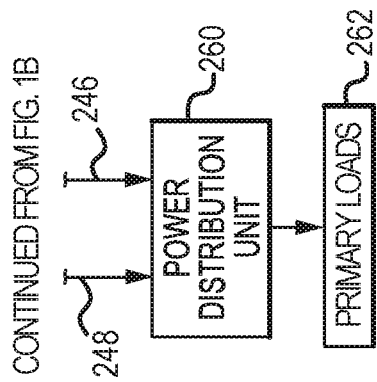
Figure 1C:
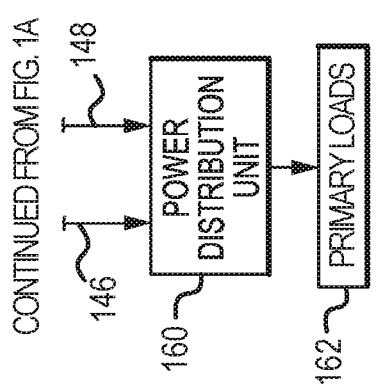

With reference to FIG. 1A through FIG. 1D, a power management and distribution (PMAD) system 100 with primary load support is illustrated, in accordance with various embodiments. PMAD System 100 may include a high voltage system, as illustrated in FIG. 1A and FIG. 1C, and a low voltage system, as illustrated in FIG. 1B and FIG. 1D. With reference to FIG. 1A, PMAD system 100 may include a plurality of power sources (also referred to herein as a first plurality of power sources) 102. Power sources 102 may include a solar array (also referred to herein as a first solar array) 104, a battery (also referred to herein as a first battery) 106, and/or a supercapacitor (also referred to herein as a first supercapacitor) 108. Solar array 104 may comprise a solar photovoltaic power system. Battery 106 may comprise a lithium-ion battery. PMAD system 100 may include unregulated direct current (DC) bus 120. Power sources 102 may supply power to unregulated DC bus 120. Solar array 104 may supply power to unregulated DC bus 120. Battery 106 may supply power to unregulated DC bus 120. Supercapacitor 108 may supply power to unregulated DC bus 120.

In various embodiments, PMAD System 100 may include a maximum power point tracking (MPPT) converter (also referred to herein as a first MPPT converter) 112, a bidirectional DC/DC converter (also referred to herein as a first bidirectional DC/DC converter) 114, and bidirectional DC/DC converter (also referred to herein as a second bidirectional DC/DC converter) 116. MPPT converter 112 may be coupled between solar array 104 and unregulated DC bus 120. Bidirectional DC/DC converter 114 may be coupled between battery 106 and unregulated DC bus 120. Bidirectional DC/DC converter 116 may be coupled between supercapacitor 108 and unregulated DC bus 120.

In various embodiments, PMAD System 100 may include first collector bus 118 connected in series between power sources 102 and unregulated DC bus 120. In this regard, power sources 102 may supply power to unregulated DC bus 120 via first collector bus 118. First collector bus 118 may receive power from solar array 104, via MPPT converter 112. First collector bus 118 may receive power from battery 106, via bidirectional DC/DC converter 114. First collector bus 118 may receive power from supercapacitor 108, via bidirectional DC/DC converter 116. In various embodiments, battery 106 may receive power from solar array 104, via first collector bus 118. In various embodiments, supercapacitor 108 may receive power from solar array 104, via first collector bus 118. Solar array 104 may supply power to battery 106, via first collector bus 118, in response to battery 106 having a charge which is less than a threshold value, for example. Solar array 104 may supply power to battery 106, via first collector bus 118, in response to solar array 104 supplying power to first collector bus 118 while solar array 104 receives sunlight. Similarly, solar array 104 may supply power to supercapacitor 108 via first collector bus 118.

In various embodiments, PMAD system 100 may include a bidirectional DC/DC converter (also referred to herein as a first bidirectional DC/DC converter) 130. PMAD System 200 may include a bidirectional DC/DC converter (also referred to herein as a second bidirectional DC/DC converter) 132. PMAD system 100 may include an intermediate load sharing regulator (also referred to herein as a first intermediate load sharing regulator) 134. PMAD system 100 may include a first intermediate regulated bus 136 and a second intermediate regulated bus 138. Bidirectional DC/DC converter 130 may receive power from unregulated DC bus 120. Bidirectional DC/DC converter 132 may receive power from unregulated DC bus 120. Intermediate load sharing regulator 134 may be in electronic communication with bidirectional DC/DC converter 130 and in electronic communication with bidirectional DC/DC converter 132. Intermediate load sharing regulator 134 may regulate power received by first intermediate regulated bus 136 from bidirectional DC/DC converter 130. Intermediate load sharing regulator 134 may regulate power received by second intermediate regulated bus 138 from bidirectional DC/DC converter 132. First intermediate regulated bus 136 and second intermediate regulated bus 138 may be configured in parallel. PMAD system 100 may include a regulated high voltage direction current (HVDC) bus 140. Bidirectional DC/DC converter 130 may be connected in series between unregulated DC bus 120 and regulated HVDC bus 140. Bidirectional DC/DC converter 132 may be connected in series between unregulated DC bus 120 and regulated HVDC bus 140. Regulated HVDC bus 140 may receive power from first intermediate regulated bus 136 and/or second intermediate regulated bus 138. In this regard, unregulated DC bus 120 may supply power to regulated HVDC bus 140 via bidirectional DC/DC converter 130 and/or bidirectional DC/DC converter 132. Bidirectional DC/DC converter 130 and bidirectional DC/DC converter 132 may each be galvanically isolated.

In various embodiments, PMAD SYSTEM 100 may include power distribution unit (PDU) (also referred to herein as a first secondary PDU) 150. In various embodiments, PDU 150 may be connected, in direct electronic communication, with regulated HVDC bus 140. PDU 150 may distribute electric power from regulated HVDC bus 140 to loads 152. PDU 150 may comprise electric fuses, circuit breakers, and/or solid state power controllers (SSPCs). Loads 152 may be referred to herein as a first plurality of secondary loads. For example, loads 152 may include lights or other secondary electronic devices configured to receive power.

In various embodiments, PMAD system 100 may include a primary load HVDC bus 142. Primary load HVDC bus 142 may receive electric power from regulated HVDC bus 140. PMAD system 100 may include a supercapacitor 122 and a bidirectional DC/DC converter 124. Supercapacitor 122 may supply electric power to primary load HVDC bus 142 via bidirectional DC/DC converter 124. PMAD system 100 may include a bidirectional DC/DC converter (also referred to herein as a primary load bidirectional DC/DC converter) 144. Bidirectional DC/DC converter 144 may be galvanically isolated. Bidirectional DC/DC converter 144 may receive power from unregulated DC bus 120.

With combined reference to FIG. 1A and FIG. 1C, PMAD system 100 may include a PDU 160. PDU 160 may receive power from primary load HVDC bus 142 and/or from bidirectional DC/DC converter 144. In various embodiments, PDU 160 may be connected, in direct electronic communication, with primary load HVDC bus 142. In various embodiments, PDU 160 may be connected, in direct electronic communication, with bidirectional DC/DC converter 144. PDU 160 may direct said power to various primary loads 162. In various embodiments, primary loads 162 may comprise actuators, motors, or any other electronic device configured to receive power. In this regard, PDU 160 may be configured to receive a power signal (also referred to herein as a first power) 146 via the primary load HVDC bus 142 and/or a power signal (also referred to herein as a second power) 148 via the bidirectional DC/DC converter 144. In this manner, the architecture of PMAD system 100 provides redundancy to support primary loads 162.

In various embodiments, PMAD System 100 may include a main load sharing regulator 101. Main load sharing regulator 101 may be in electronic communication with MPPT converter 112, bidirectional DC/DC converter 114, and/or bidirectional DC/DC converter 116. Main load sharing regulator 101 may regulate the power received by first collector bus 118 from solar array 104, battery 106, and/or supercapacitor 108. In various embodiments, main load sharing regulator 101 may regulate the power received by battery 106 from solar array 104. In various embodiments, main load sharing regulator 101 may regulate the power received by supercapacitor 108 from solar array 104.

With reference to FIG. 1B, PMAD System 100 may include a plurality of power sources (also referred to herein as a second plurality of power sources) 202, and a second collector bus 218. Power sources 202 may include solar array (also referred to herein as a second solar array) 204, an MPPT converter (also referred to herein as a second MPPT converter) 212, a bidirectional DC/DC converter (also referred to herein as a second bidirectional DC/DC converter) 214, a battery (also referred to herein as a second battery) 206.

In various embodiments, PMAD System 100 may include a maximum power point tracking (MPPT) converter (also referred to herein as a second MPPT converter) 212, a bidirectional DC/DC converter (also referred to herein as a third bidirectional DC/DC converter) 214, and bidirectional DC/DC converter (also referred to herein as a fourth bidirectional DC/DC converter) 216. MPPT converter 212 may be coupled between solar array 204 and unregulated DC bus 120. Bidirectional DC/DC converter 214 may be coupled between battery 206 and unregulated DC bus 120. Bidirectional DC/DC converter 216 may be coupled between supercapacitor 208 and unregulated DC bus 120. Power sources 202, MPPT converter 212, and bidirectional DC/DC converter 214 may be similar to power sources 102, MPPT converter 112, and bidirectional DC/DC converter 114, respectively.

In various embodiments, PMAD System 100 may include second collector bus 218 connected in series between power sources 202 and unregulated DC bus 120. In this regard, power sources 202 may supply power to unregulated DC bus 120 via second collector bus 218. Second collector bus 218 may receive power from solar array 204, via MPPT converter 212. Second collector bus 218 may receive power from battery 206, via bidirectional DC/DC converter 214. Second collector bus 218 may receive power from supercapacitor 208, via bidirectional DC/DC converter 216. In various embodiments, battery 206 may receive power from solar array 204, via second collector bus 218. In various embodiments, supercapacitor 208 may receive power from solar array 204, via second collector bus 218. Solar array 204 may supply power to battery 206, via second collector bus 218, in response to battery 206 having a charge which is less than a threshold value, for example. Solar array 204 may supply power to battery 206, via second collector bus 218, in response to solar array 104 supplying power to second collector bus 218 while solar array 104 receives sunlight. Similarly, solar array 104 may supply power to supercapacitor 108 via second collector bus 218.

In various embodiments, PMAD system 100 may include a bidirectional DC/DC converter (also referred to herein as a third bidirectional DC/DC converter) 230. PMAD System 100 may include a bidirectional DC/DC converter (also referred to herein as a fourth bidirectional DC/DC converter) 232. PMAD system 100 may include an intermediate load sharing regulator (also referred to herein as a second intermediate load sharing regulator) 234. PMAD system 100 may include a third intermediate regulated bus 236 and a fourth intermediate regulated bus 238. Bidirectional DC/DC converter 230 may receive power from unregulated DC bus 120. Bidirectional DC/DC converter 232 may receive power from unregulated DC bus 120. Intermediate load sharing regulator 234 may be in electronic communication with bidirectional DC/DC converter 230 and in electronic communication with bidirectional DC/DC converter 232. Intermediate load sharing regulator 234 may regulate power received by third intermediate regulated bus 236 from bidirectional DC/DC converter 230. Intermediate load sharing regulator 234 may regulate power received by fourth intermediate regulated bus 238 from bidirectional DC/DC converter 232. Third intermediate regulated bus 236 and fourth intermediate regulated bus 238 may be configured in parallel. PMAD system 100 may include a regulated low voltage direction current (LVDC) bus 240. Bidirectional DC/DC converter 230 may be connected in series between unregulated DC bus 120 and regulated LVDC bus 240. Bidirectional DC/DC converter 232 may be connected in series between unregulated DC bus 120 and regulated LVDC bus 240. Regulated LVDC bus 240 may receive power from third intermediate regulated bus 236 and/or fourth intermediate regulated bus 238. In this regard, unregulated DC bus 120 may supply power to regulated LVDC bus 240 via bidirectional DC/DC converter 230 and/or bidirectional DC/DC converter 232. Bidirectional DC/DC converter 230 and bidirectional DC/DC converter 232 may each be galvanically isolated.

In various embodiments, PMAD system 100 may include power distribution unit (PDU) (also referred to herein as a second secondary PDU) 250. In various embodiments, PDU 250 may be connected, in direct electronic communication, with regulated LVDC bus 240. PDU 250 may distribute electric power from regulated LVDC bus 240 to loads 252. PDU 250 may comprise electric fuses, circuit breakers, and/or SSPCs. Loads 252 may be referred to herein as a second plurality of secondary loads. For example, loads 252 may include lights or other secondary electronic devices configured to receive power.

In various embodiments, PMAD system 100 may include a primary load LVDC bus 242. Primary load LVDC bus 242 may receive electric power from regulated LVDC bus 240. PMAD system 100 may include a supercapacitor 222 and a bidirectional DC/DC converter 224. Supercapacitor 222 may supply electric power to primary load LVDC bus 242 via bidirectional DC/DC converter 224. PMAD system 100 may include a bidirectional DC/DC converter 244. Bidirectional DC/DC converter 244 may be galvanically isolated. Bidirectional DC/DC converter 244 may receive power from unregulated DC bus 120.

With combined reference to FIG. 1B and FIG. 1D, PMAD system 100 may include a PDU 260. PDU 260 may receive power from primary load LVDC bus 242 and/or from bidirectional DC/DC converter 244. In various embodiments, PDU 260 may be connected, in direct electronic communication, with primary load LVDC bus 242. In various embodiments, PDU 260 may be connected, in direct electronic communication, with bidirectional DC/DC converter 244. PDU 260 may direct said power to various primary loads 262. In various embodiments, primary loads 262 may comprise actuators, motors, or any other electronic device configured to receive power. In this regard, PDU 260 may be configured to receive a power signal (also referred to herein as a third power) 246 via the primary load LVDC bus 242 and/or a power signal (also referred to herein as a fourth power) 248 via the bidirectional DC/DC converter 244. In this manner, the architecture of PMAD system 100 provides redundancy to support primary loads 262.

With reference to FIG. 1B, main load sharing regulator 101 may be in electronic communication with MPPT converter 212, bidirectional DC/DC converter 214 and/or bidirectional DC/DC converter 216. Main load sharing regulator 101 may regulate the power received by second collector bus 218 from solar array 204, battery 206 and/or supercapacitor 208. In various embodiments, main load sharing regulator 101 may regulate the power received by battery 206 from solar array 204. In various embodiments, main load sharing regulator 101 may regulate the power received by supercapacitor 208 from solar array 204.

With combined reference to FIG. 1A through FIG. 1D, bidirectional DC/DC converters 124, 130, 132, 144, 230, 232, 224, and/or 244 may provide charging capabilities between loads, 152, 162, 252, and/or 262. In various embodiments, a primary load 162 may comprise a regenerative device, such as a motor/generator, for example. Said load 162 may supply electric power to unregulated DC bus 120, via bidirectional DC/DC converter 144 for example, to charge any of plurality of power sources 102, 202.

Figure 2:
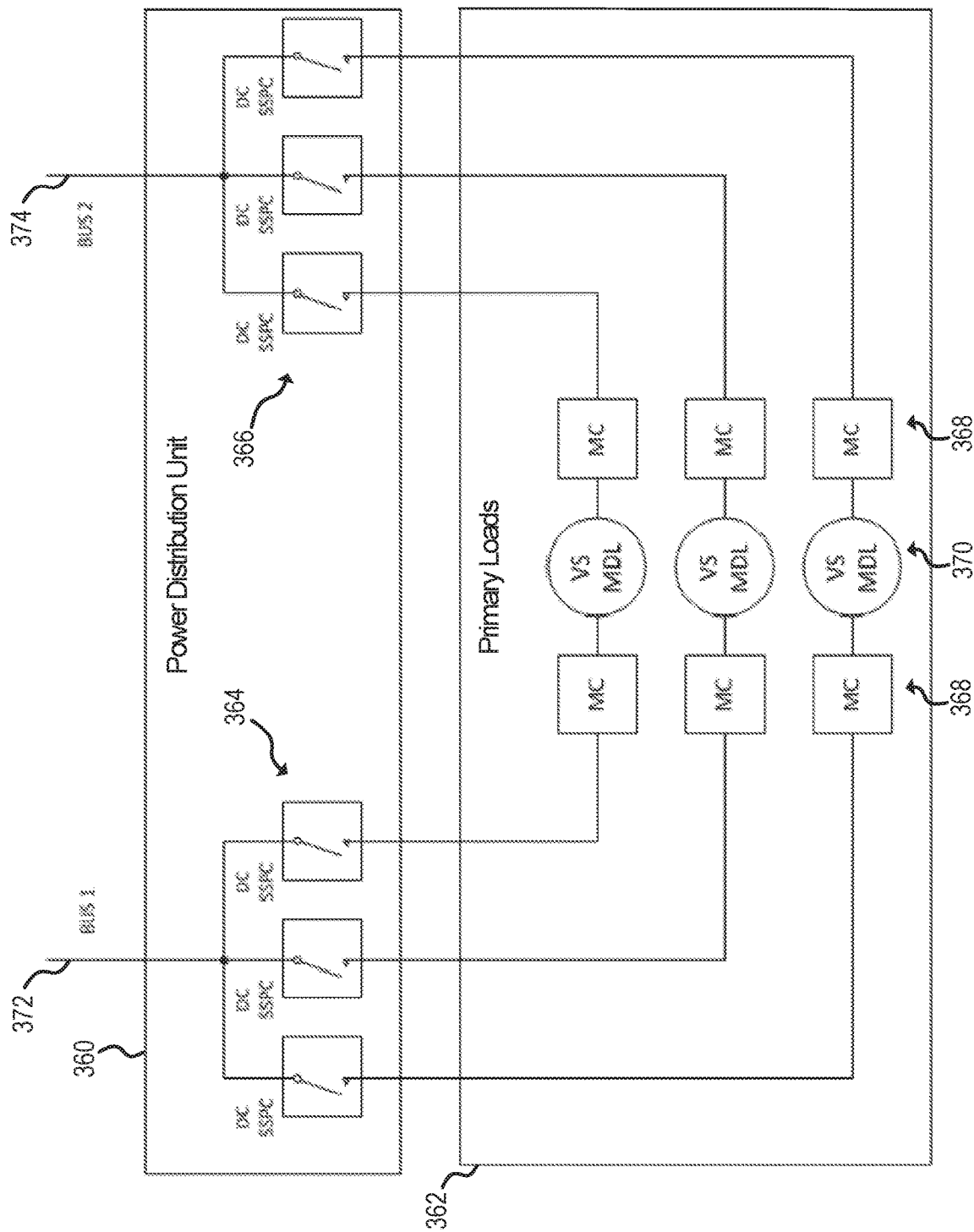
FIGS. 2 and 3 each illustrate a schematic view of power distribution unit (PDU) in electronic communication with primary loads, in accordance with various embodiments.

With reference to FIG. 2, a schematic view of a PDU 360 coupled electronically to a plurality of primary loads 362 is illustrated, in accordance with various embodiments. The PDU 360 may comprise a first plurality of DC solid state power controllers (SSPCs) 364 coupled to a first bus 372. The first plurality of DC SSPCs 364 may control a first power received via the first bus 372. The PDU 360 may comprise a second plurality of DC SSPCs 366 coupled to a second bus 374. The second plurality of DC SSPCs 366 may control a second power received via the second bus 374.

In various embodiments, primary loads 362 may comprise a plurality of motor controllers 368 coupled to a plurality of variable speed motor driven loads (VS MDLs) 370. The plurality of motor controllers 368 may receive the first power via the first plurality of DC SSPCs 364. The plurality of motor controllers 368 may receive the second power via the second plurality of DC SSPCs 366. In this manner, PDU 360 may supply and control power to one or more VS MDLs 370. In various embodiments, a VS MDL 370 may comprise a permanent magnet motor comprising a dual set of stator windings, or the like.

Figure 3:
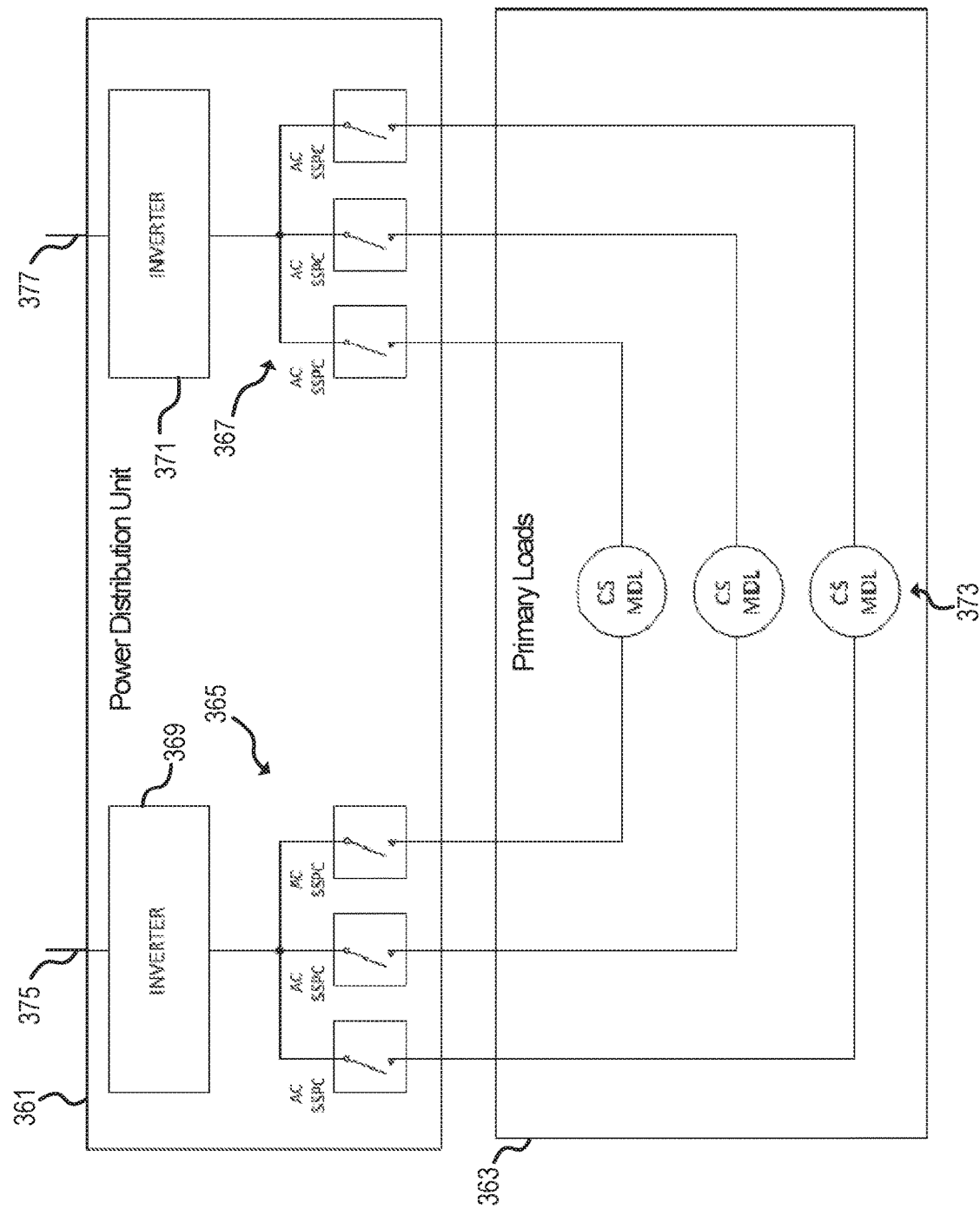

With reference to FIG. 3, a schematic view of a PDU 361 coupled electronically to a plurality of primary loads 363 is illustrated, in accordance with various embodiments. PDU 361 may comprise a first inverter 369 and a second inverter 371. First inverter 369 may receive a first DC power from a first bus 375. First inverter 369 may produce a first alternating current (AC) power. PDU 361 may comprise a first plurality of AC SSPCs 365 electronically coupled to first inverter 369. First plurality of AC SSPCs 365 may receive said first AC power from first inverter 369. First plurality of AC SSPCs 365 may control said first AC power. Second inverter 371 may receive a second DC power from a second bus 377. Second inverter 371 may produce a second AC power. Second plurality of AC SSPCs 367 may receive said second AC power from second inverter 371. Second plurality of AC SSPCs 367 may control said second AC power.

In various embodiments, primary loads 363 may comprise a plurality of constant speed motor driven loads (CS MDLs) 373. The CS MDLs 373 may receive the first AC power via the first plurality of AC SSPCs 365. The CS MDLs 373 may receive the second AC power via the second plurality of AC SSPCs 367. In this manner, PDU 361 may supply and control power to one or more CS MDLs 373. In various embodiments, a CS MDL 373 may comprise an induction motor comprising a dual set of stator windings, or the like.

Figure 4:
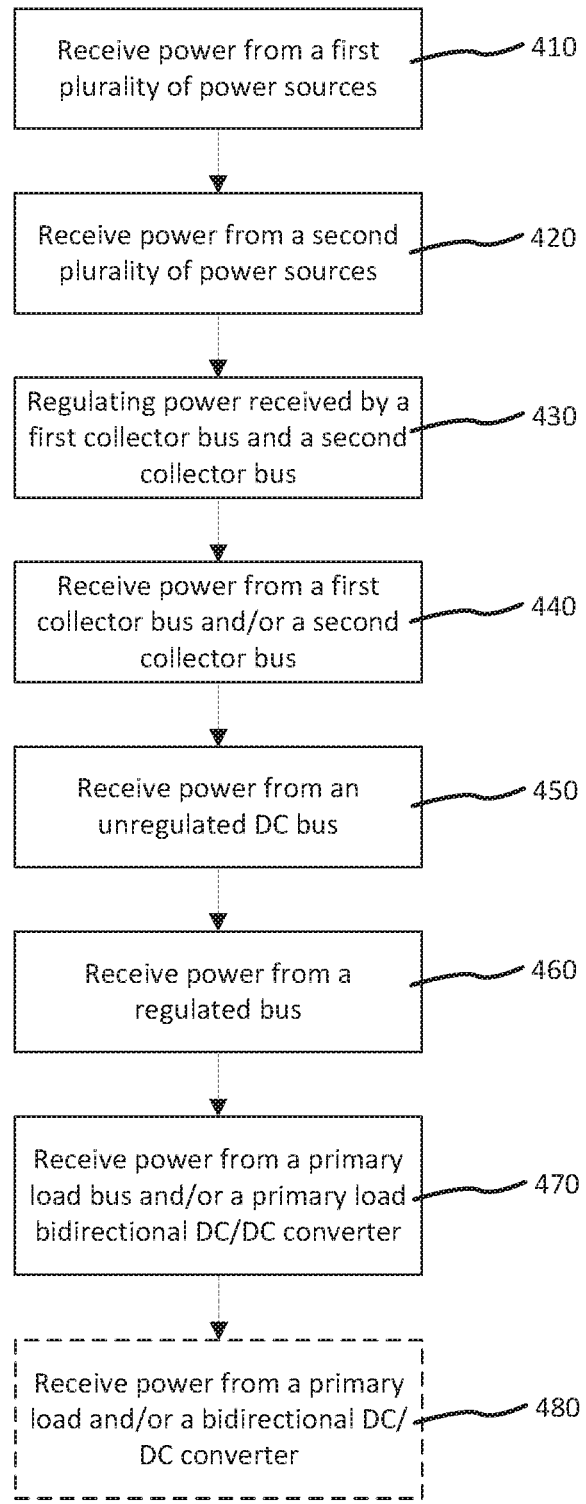
FIG. 4 illustrates a method for supplying electric power to a load, in accordance with various embodiments.

With reference to FIG. 4, a method 400 for supplying power to a load is illustrated, in accordance with various embodiments. Method 400 includes receiving power from a first plurality of power sources (step 410). Method 400 includes receiving power from a second plurality of power sources (step 420). Method 400 includes regulating power received by a first collector bus and a second collector bus (step 430). Method 400 includes receiving power from a first collector bus and/or a second collector bus (step 440). Method 400 includes receiving power from an unregulated DC bus (step 450). Method 400 includes receiving power from a regulated bus (step 460). Method 400 includes receiving power from a primary load HVDC bus, a primary load LVDC bus, and/or a primary load bidirectional DC/DC converter (step 470). Method 400 may include receiving power from a primary load and/or a bidirectional DC/DC converter (step 480).

With combined reference to FIG. 1A, FIG. 1B, FIG. 1C, FIG. 1D and FIG. 4, step 410 may include receiving, by first collector bus 118, power from a first plurality of power sources 102. Step 420 may include receiving, by second collector bus 218, power from a second plurality of power sources 202. Step 430 may include regulating, by main load sharing regulator 101, the power received by first collector bus 118 and the power received by second collector bus 218. Step 440 may include receiving, by unregulated DC bus 120, power from at least one of the first collector bus 118 and the second collector bus 218. Step 450 may include receiving, by regulated HVDC bus 140, power from the unregulated DC bus 120. Step 450 may include receiving, by regulated LVDC bus 240, power from the unregulated DC bus 120. Step 450 may include receiving, by bidirectional DC/DC converter 144, electric power from unregulated DC bus 120. Step 460 may include receiving, by primary load HVDC bus 142, power from regulated HVDC bus 140. Step 470 may include receiving, by PDU 160, electric power from at least one of the primary load HVDC bus 142 and the bidirectional DC/DC converter 144. Step 470 may include receiving, by PDU 260, electric power from at least one of the primary load LVDC bus 242 and the bidirectional DC/DC converter 244. Step 480 may include receiving, by primary load HVDC bus 142, power from at least one of the primary load 162 and bidirectional DC/DC converter 124. Step 480 may include receiving, by primary load LVDC bus 242, power from at least one of the primary load 262 and bidirectional DC/DC converter 224.

Figure 5:
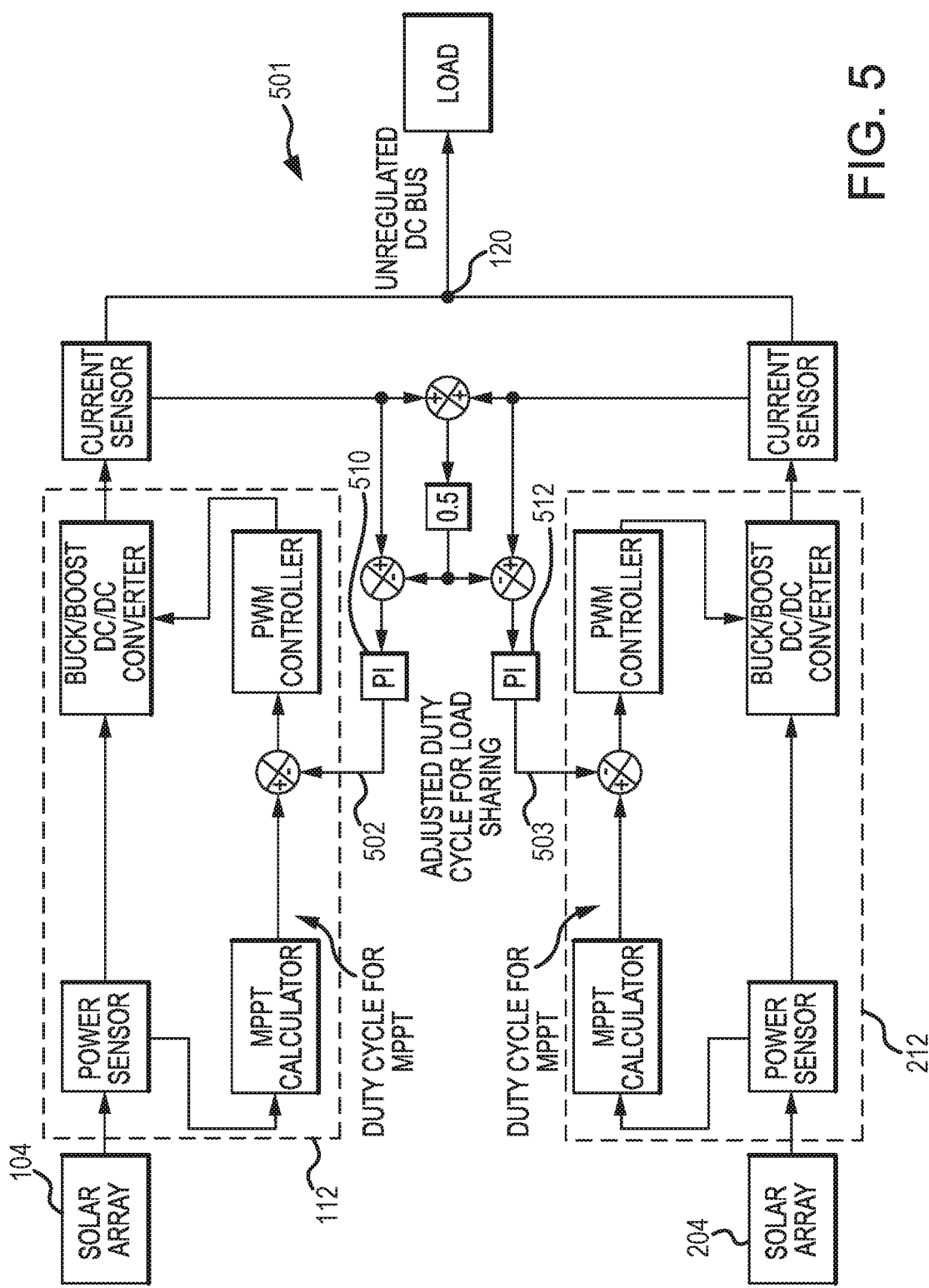
FIG. 5 illustrates a schematic view of a load sharing regulator configured to regulate electric power supplied by a first solar array and a second solar array, in accordance with various embodiments.

With reference to FIG. 5, a schematic view of a load sharing regulator 501 in electronic communication with solar array 104 and solar array 204 is illustrated, in accordance with various embodiments. In various embodiments, main load sharing regulator 101 may be similar to load sharing regulator 501, with momentary reference to FIG. 1A. Load sharing regulator 501 may regulate the power received from solar array 104 and solar array 204 to balance the output currents of solar array 104 and solar array 204 received by unregulated DC bus 120. More specifically, load sharing regulator 501 may control current output from MPPT converter 112 and current output from MPPT converter 212. The average current output between MPPT converter 112 and MPPT converter 212 may be subtracted from the actual current output of MPPT converter 112 and MPPT converter 212 to produce a first error signal sent to a first proportional-integral (PI) controller 510 and a second error signal sent to a second PI controller 512. The first PI controller 510 and the second PI controller 512 may then output a first duty cycle signal 502 and a duty cycle signal 503, respectively. The first duty cycle signal 502 may be received by a summing block included in the MPPT converter 112 which is used by the corresponding pulse width modulator (PWM) controller. The second duty cycle signal 503 may be received by a summing block included in the MPPT converter 212 which is used by the corresponding PWM controller. In this regard, the load current is controlled.

Figure 6:
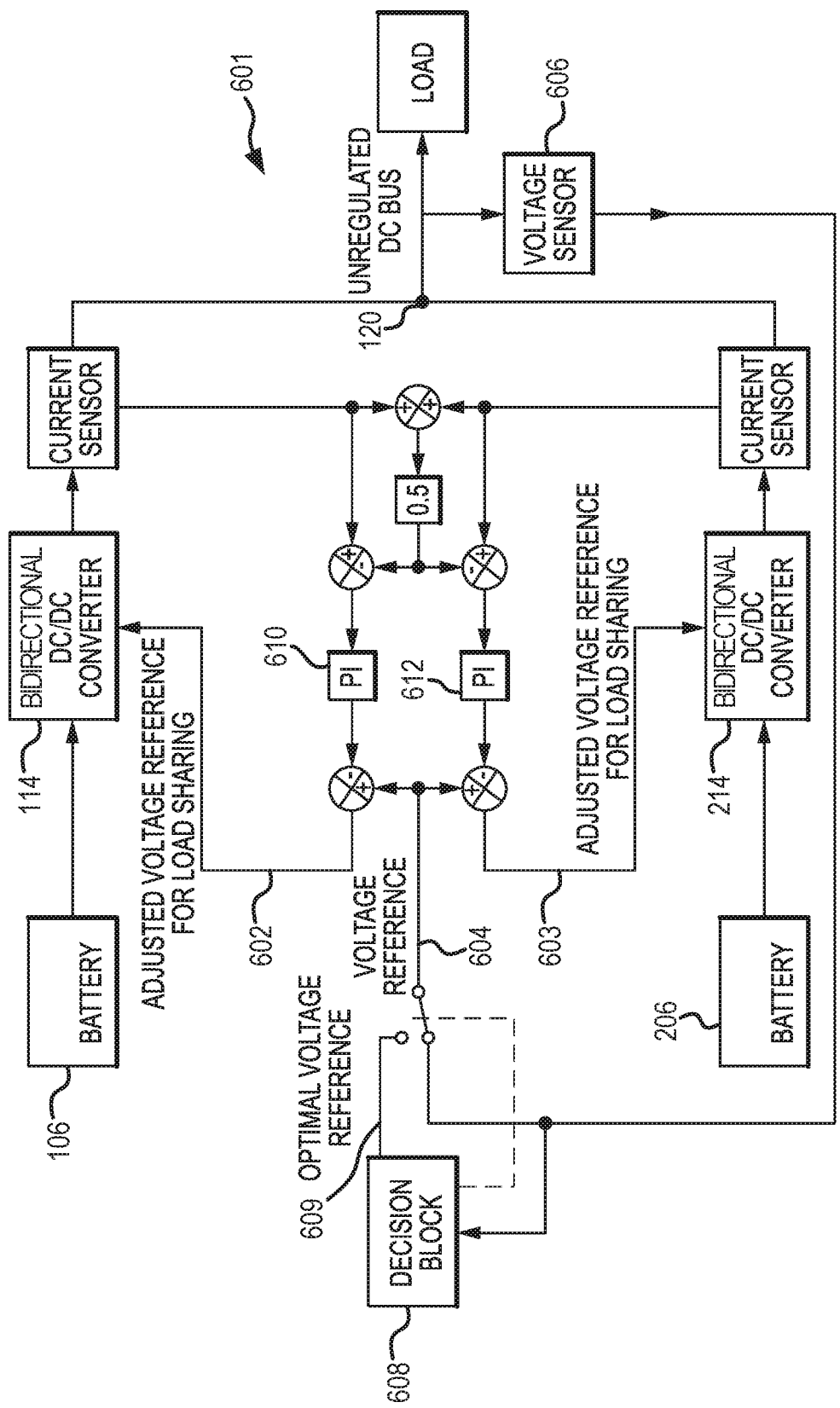
FIG. 6 illustrates a schematic view of a load sharing regulator configured to regulate electric power supplied by a first battery and a second battery, in accordance with various embodiments.

With reference to FIG. 6, a schematic view of a load sharing regulator 601 in electronic communication with battery 106 and battery 206 is illustrated, in accordance with various embodiments. In various embodiments, main load sharing regulator 101 may be similar to load sharing regulator 601, with momentary reference to FIG. 1A. Load sharing regulator 601 may regulate the power received from battery 106 and battery 206 to balance the output currents of bidirectional DC/DC converter 114 and bidirectional DC/DC converter 214 received by unregulated DC bus 120. The average current output between bidirectional DC/DC converter 114 and bidirectional DC/DC converter 214 may be subtracted from the actual current output of bidirectional DC/DC converter 114 and bidirectional DC/DC converter 214 to produce a first error signal sent to a first PI controller 610 and a second error signal sent to a second PI controller 612. The PI controller 610 and the PI controller 612 may then output an adjusted voltage reference 602 and an adjusted voltage reference 603, respectively. The adjusted voltage reference 602 and adjusted voltage reference 603 may be received by bidirectional DC/DC converter 114 and bidirectional DC/DC converter 214, respectively. A voltage reference 604 is received from a voltage sensor 606 in electronic communication with the unregulated DC bus 120. A decision block 608 may indicate to use the voltage reference 604 from the voltage sensor 606. Decision block 608 may indicate to use the voltage reference 604 from an optimal voltage reference 609 in response to the voltage of the unregulated DC bus 120 dropping below a threshold value. In this regard, load sharing regulator 601 may draw electric power from battery 106 and battery 206 in response to the voltage of unregulated DC bus 120 dropping below a threshold value. In this regard, the load current is controlled.

Figure 7:
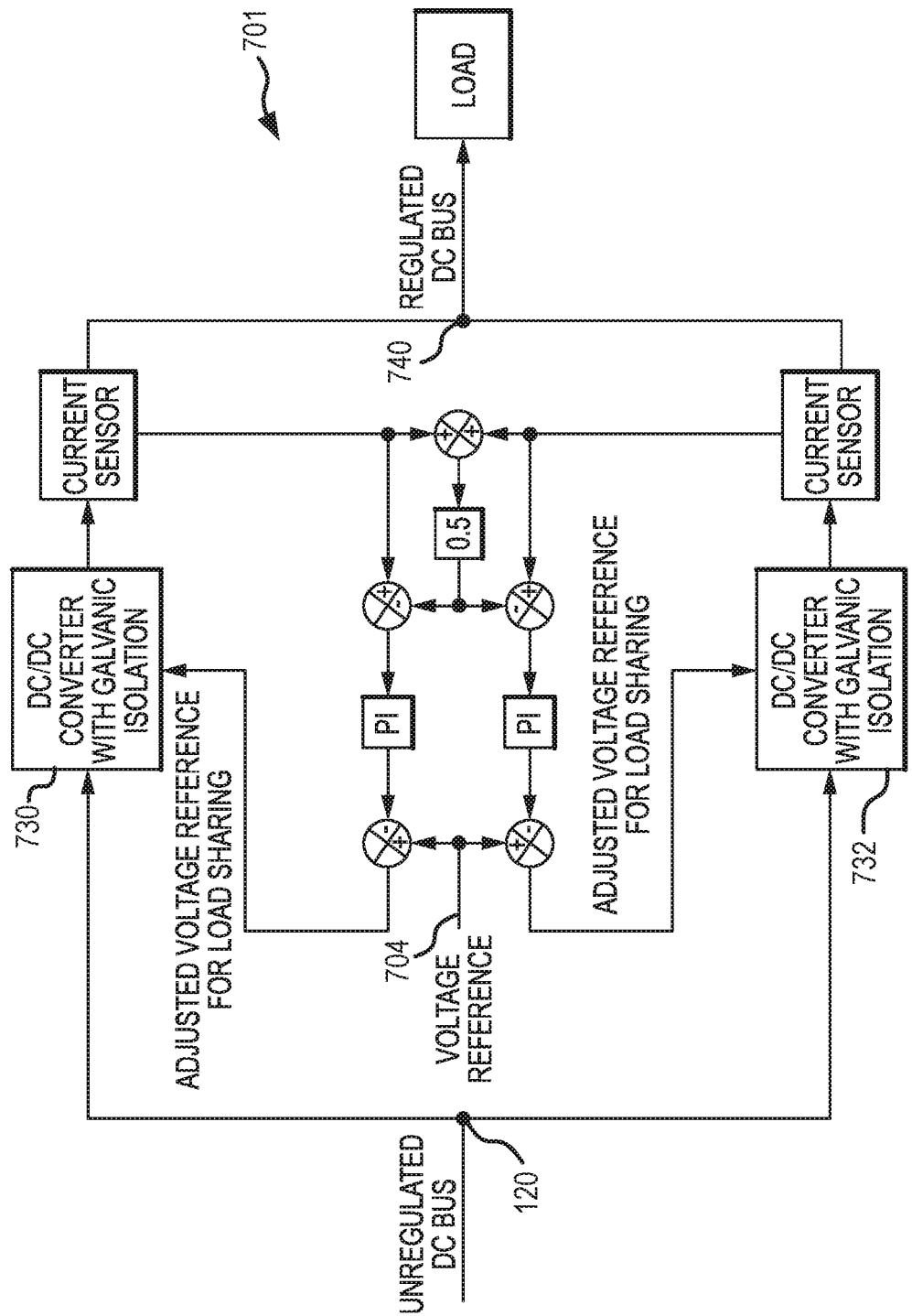
FIG. 7 illustrates a schematic view of a load sharing regulator for a first DC/DC converter and a second DC/DC converter connected in parallel to an unregulated DC bus, in accordance with various embodiments.

With reference to FIG. 7, a schematic view of a load sharing regulator 701 in electronic communication with DC/DC converter 730 and DC/DC converter 732 is illustrated, in accordance with various embodiments. In various embodiments, DC/DC converter 730 and DC/DC converter 732 may be similar to bidirectional DC/DC converter 130 and bidirectional DC/DC converter 132, respectively, with momentary reference to FIG. 1A. In various embodiments, DC/DC converter 730 and DC/DC converter 732 may be similar to bidirectional DC/DC converter 230 and bidirectional DC/DC converter 232, respectively, with momentary reference to FIG. 1B. Load sharing regulator 701 may regulate the power received from unregulated DC bus 120, via DC/DC converter 730 and DC/DC converter 732 to balance the output currents of DC/DC converter 730 and DC/DC converter 732 received by regulated DC bus 740. In various embodiments, regulated HVDC bus 140 may be similar to regulated DC bus 740, with momentary reference to FIG. 1A. In various embodiments, regulated LVDC bus 240 may be similar to regulated DC bus 740, with momentary reference to FIG. 1B. In various embodiments, voltage reference 704 may comprise a desired value of regulated HVDC bus 140, for example 270 volts. In various embodiments, voltage reference 704 may comprise a desired value of regulated LVDC bus 240, for example 28 volts.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power management and distribution (PMAD) system, comprising:
a first plurality of power sources comprising at least one of a first solar array, a first supercapacitor, and a first battery;
a first collector bus configured to receive power from the first plurality of power sources;
an unregulated DC bus configured to receive power from the first collector bus;
a regulated high voltage direct current (HVDC) bus configured to receive a first power from the unregulated DC bus;
a first primary load bidirectional DC/DC converter configured to receive a second power from the unregulated DC bus;
a first secondary power distribution unit (PDU) configured to receive the first power from the regulated HVDC bus; and
a first primary PDU configured to receive at least one of the first power from the regulated HVDC bus and the second power from the first primary load bidirectional DC/DC converter,
wherein the first primary PDU is configured to supply power to a primary load.

2. The PMAD system of claim 1, further comprising:
a primary load HVDC bus configured to receive the first power from the regulated HVDC bus and supply the first power to the first primary PDU; and
a supercapacitor electronically coupled to the primary load HVDC bus and configured to supply power to the primary load HVDC bus.

3. The PMAD system of claim 2, further comprising:
a second plurality of power sources comprising at least one of a second solar array, a second supercapacitor, and a second battery;
a second collector bus configured to receive power from the second plurality of power sources;
a regulated low voltage direct current (LVDC) bus configured to receive a third power from the unregulated DC bus;
a second primary load bidirectional DC/DC converter configured to receive a fourth power from the unregulated DC bus;
a second secondary power distribution unit (PDU) configured to receive the third power from the regulated LVDC bus; and
a second primary PDU configured to receive at least one of the third power from the regulated LVDC bus and the fourth power from the second primary load bidirectional DC/DC converter,
wherein the unregulated DC bus is configured to receive power from the second collector bus.

4. The PMAD system of claim 3, further comprising a main load sharing regulator configured to regulate the power received by the first collector bus from the first plurality of power sources and configured to regulate the power received by the second collector bus from the second plurality of power sources.

5. The PMAD system of claim 4, wherein the first collector bus and the second collector bus are connected in parallel.

6. The PMAD system of claim 5, wherein the regulated HVDC bus is configured to receive power from the unregulated DC bus via:
a first bidirectional DC/DC converter connected in series with a first intermediate regulated bus; and
a second bidirectional DC/DC converter connected in series with a second intermediate regulated bus,
wherein the first intermediate regulated bus and the second intermediate regulated bus are connected in parallel.

7. A power management and distribution (PMAD) system, comprising:
a main load sharing regulator;
a first collector bus in electronic communication with the main load sharing regulator;
a first plurality of power sources configured to supply power to the first collector bus;
an unregulated DC bus in electronic communication with the first collector bus and configured to receive power from the first collector bus;
a first bidirectional DC/DC converter in electronic communication with the unregulated DC bus;
a second bidirectional DC/DC converter in electronic communication with the unregulated DC bus;
a first intermediate load sharing regulator in electronic communication with the first bidirectional DC/DC converter and the second bidirectional DC/DC converter, the first intermediate load sharing regulator configured to regulate the first bidirectional DC/DC converter and the second bidirectional DC/DC converter;
a first intermediate regulated bus in electronic communication with the first bidirectional DC/DC converter;
a second intermediate regulated bus in electronic communication with the second bidirectional DC/DC converter, the first intermediate regulated bus and the second intermediate regulated bus connected in parallel;

a regulated high voltage direct current (HVDC) bus
configured to receive power from at least one of the first
intermediate regulated bus and the second intermediate
regulated bus;
a primary load HVDC bus configured to receive power
from the regulated HVDC bus;
a first power source configured to supply power to the
primary load HVDC bus;
a primary power distribution unit (PDU); and
a primary load bidirectional DC/DC converter configured
to receive power from the unregulated DC bus and
configured to supply power to the primary PDU,
wherein the primary PDU is configured to supply power
to a first load.

8. The PMAD system of claim 7, further comprising:
a second collector bus in electronic communication with
the main load sharing regulator and in electronic communication with the unregulated DC bus,
a second plurality of power sources configured to supply
power to the second collector bus;
a third bidirectional DC/DC converter in electronic communication with the unregulated DC bus;
a fourth bidirectional DC/DC converter in electronic
communication with the unregulated DC bus;
a second intermediate load sharing regulator in electronic
communication with the third bidirectional DC/DC
converter and the fourth bidirectional DC/DC converter, the second intermediate load sharing regulator
configured to regulate the third bidirectional DC/DC
converter and the fourth bidirectional DC/DC converter;
a third intermediate regulated bus in electronic communication with the third bidirectional DC/DC converter;
a fourth intermediate regulated bus in electronic communication with the fourth bidirectional DC/DC converter,
the third intermediate regulated bus and the fourth
intermediate regulated bus connected in parallel;
a regulated low voltage direct current (LVDC) bus configured to receive power from at least one of the third
intermediate regulated bus and the fourth intermediate
regulated bus,
a primary load LVDC bus configured to receive power
from the regulated LVDC bus;
a second power source configured to supply power to the
primary load LVDC bus;
a second primary power distribution unit (PDU); and
a second primary load bidirectional DC/DC converter
configured to receive power from the unregulated DC
bus and configured to supply power to the second
primary PDU,
wherein the second primary PDU is configured to supply
power to a second load.

9. The PMAD system of claim 8, wherein the first collector bus and the second collector bus are connected in parallel.

10. The PMAD system of claim 9, wherein the unregulated DC bus is connected in series with the first collector bus and connected in series with the second collector bus.

11. The PMAD system of claim 10, wherein the first collector bus, the unregulated DC bus, the first bidirectional DC/DC converter, the first intermediate regulated bus, and the regulated HVDC bus are connected in series.

12. The PMAD system of claim 11, wherein the first bidirectional DC/DC converter and the second bidirectional DC/DC converter are connected in parallel.

13. The PMAD system of claim 12, wherein the first load comprises a high voltage load and the second load comprises a low voltage load.

14. The PMAD system of claim 13, wherein the first plurality of power sources comprises:
a first solar array configured to supply power to the first collector bus via a first maximum power point tracking (MPPT) converter;
a first battery in electronic communication with the first collector bus via the first bidirectional DC/DC converter; and
a first supercapacitor in electronic communication with the first collector bus configured to at least one of receive power from the first collector bus, via the third bidirectional DC/DC converter, and supply power to the first collector bus, via the third bidirectional DC/DC converter.

15. The PMAD system of claim 14, wherein the second plurality of power sources comprises:
a second solar array configured to supply power to the second collector bus via a second maximum power point tracking (MPPT) converter;
a second battery in electronic communication with the second collector bus via the second bidirectional DC/DC converter; and
a second supercapacitor in electronic communication with the second collector bus configured to at least one of receive power from the second collector bus, via a fourth bidirectional DC/DC converter, and supply power to the second collector bus, via the fourth bidirectional DC/DC converter.

16. The PMAD system of claim 15, wherein the main load sharing regulator controls the first MPPT converter, the second MPPT converter, the first bidirectional DC/DC converter, and the second bidirectional DC/DC converter.

17. The PMAD system of claim 16, wherein the first battery is configured to at least one of receive power from the first collector bus, via the first bidirectional DC/DC converter and supply power to the first collector bus, via the first bidirectional DC/DC converter.

18. The PMAD system of claim 8, wherein the first power source comprises a first supercapacitor and the second power source comprises a second supercapacitor.

19. A method for supplying electric power to a load comprising:
receiving, by a first collector bus, electric power from a first plurality of electric power sources;
receiving, by a second collector bus, electric power from a second plurality of electric power sources;
regulating, by a main load sharing regulator, the electric power received by the first collector bus and the electric power received by the second collector bus;
receiving, by an unregulated DC bus, electric power from at least one of the first collector bus and the second collector bus, the first collector bus and the second collector bus connected in parallel;
receiving, by a regulated high voltage direct current (HVDC) bus, electric power from the unregulated DC bus;
receiving, by a primary load HVDC bus, electric power from the regulated HVDC bus;
receiving, by a primary load bidirectional DC/DC converter, electric power from the unregulated DC bus; and
receiving, by a primary power distribution unit (PDU), electric power from at least one of the primary load HVDC bus and the primary load bidirectional DC/DC converter.

20. The method of claim 19, further comprising at least one of:
 receiving, by the primary load HVDC bus, electric power from a capacitor via a bidirectional DC/DC converter; and
 receiving, by the primary load HVDC bus, electric power from the load.

* * * * *